(12) United States Patent
Lin et al.

(10) Patent No.: US 6,731,381 B2
(45) Date of Patent: May 4, 2004

(54) METHOD AND APPARATUS TO MEASURE GAIN SPECTRA OF ERBIUM DOPED FIBER AMPLIFIER

(75) Inventors: Chinlon Lin, Holmdel, NJ (US);
Michael Mills, Freehold, NJ (US);
Morten Nissov, Holmdel, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 31 days.

(21) Appl. No.: 09/794,837

(22) Filed: Feb. 27, 2001

(65) Prior Publication Data

US 2002/0118440 A1 Aug. 29, 2002

(51) Int. Cl.⁷ .............................................. G01N 21/00
(52) U.S. Cl. ................................................. 356/73.1
(58) Field of Search ...................... 356/73.1, 460, 356/222–227, 300, 308, 328, 28, 73, 437, 440, 451, 519, 450, 464, 218, 478, 482; 250/214 A, 214 C, 338.1–338.5, 339.01, 227.17, 343, 556, 225; 359/337, 341.33, 337.13, 124, 128, 113, 160, 161, 344–345, 134, 177, 179, 142, 112; 385/27, 24, 142; 372/32, 27, 20, 6; 398/95, 34, 81

(56) References Cited

U.S. PATENT DOCUMENTS

| | | | | |
|---|---|---|---|---|
| 5,371,597 | A | | 12/1994 | Favin et al. |
| 6,094,514 | A | * | 7/2000 | Kim ........................... 359/128 |
| 6,104,477 | A | * | 8/2000 | Yoshida et al. ................ 356/73 |
| 6,275,329 | B1 | * | 8/2001 | Sieben ........................ 359/177 |
| 6,320,179 | B1 | * | 11/2001 | Cox et al. ............... 250/214 A |

* cited by examiner

*Primary Examiner*—Tu T. Nguyen (57) ABSTRACT

A test apparatus includes a broadband noise source, a test station, and a spectrum analyzer. A method using the test apparatus to measure the spectral gain of an erbium doped fiber amplifier (EDFA) under test includes steps of providing an optical signal from a broadband noise source to an input of the EDFA under test, measuring a power at a test wavelength at an output of the EDFA under test, adjusting the test wavelength, and repeating the steps of measuring and adjusting for a predetermined number of times.

19 Claims, 7 Drawing Sheets

MEASUREMENT AND ERROR PERFORMANCE OF
PRIOR ART TEST APPARATUS

METHOD AND APPARATUS TO MEASURE GAIN SPECTRA OF ERBIUM DOPED FIBER AMPLIFIER

BACKGROUND OF THE INVENTION

1. Field of the Invention

The present invention relates to a method and apparatus to measure the gain spectra of erbium doped fiber amplifiers. In particular, the invention relates to use of a filtered unpolarized amplified stimulated emission noise source in an apparatus to measure the gain spectra of erbium doped fiber amplifiers.

2. Description of Related Art

Undersea communication network systems and other fiber optic network systems require repeaters periodically spaced to compensate for attenuation in the signal transmission medium. Optical fiber networks include repeaters connected between links of optical fiber cable. Submarine optical fiber cables include one or more optical fibers and often include conductive wires (e.g., copper wires) to deliver power to the repeaters.

Most modern optical repeaters in lightwave transmission systems use optical amplifiers, and erbium doped fiber amplifiers (EDFA) have become the dominant technique for optical signal amplification. An EDFA includes a length of erbium doped fiber in which a lightwave propagates. An energy source or pump laser pumps the erbium doped fiber into an "excited" state. From this state, signal gain is produced through emission stimulated by signal light passing through the excited fiber and optical noise is produced through spontaneous decay of the excited state of the erbium doped fiber. The design of the fiber amplifier seeks to maximize the signal gain and minimize the optical noise produced while meeting the required power output and bandwidth specification.

The gain of an EDFA is characterized over its bandwidth. This gain may be shaped (via optical filters) to provide more uniform gain across all signal channels or wavelengths within the amplifier bandwidth.

To select a particular optical filter to shape the gain of the amplifier, it is essential to accurately measure the gain spectra of the EDFA across the signal bandwidth. A systematic error as small as 0.1 dB across the band will result in an accumulated error of 20 dB after 200 repeaters which yields unacceptable system performance.

Figure 1:
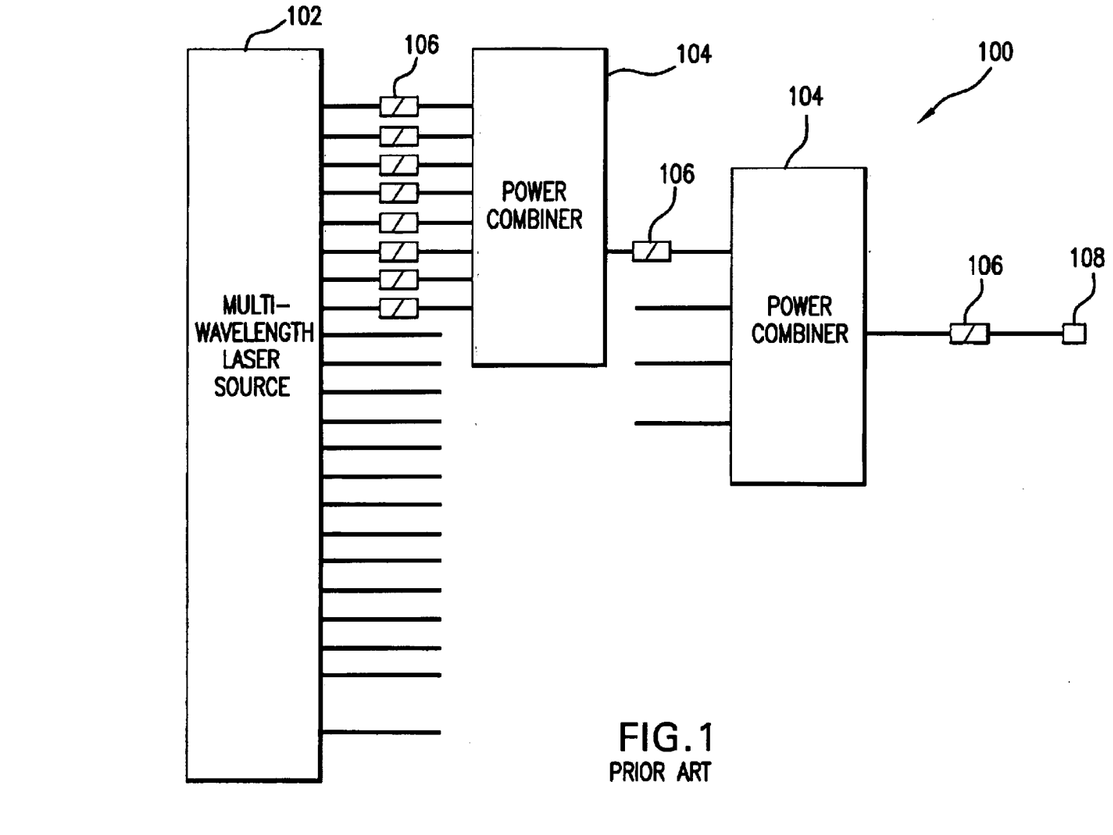
FIG. 1 is schematic diagram of a known multiple wavelength signal source used in a known test apparatus.

Conventional test equipment uses a broadband wavelength laser source with plural discrete lasers. FIG. 1, illustrates a conventional multiple wavelength source 100 that includes plural discrete laser sources 102 the optical outputs of which are combined in one or more power combiners 104 via connectors 106 into a single piece-wise broadband source. Laser sources 102 may comprise, for example, 64 laser sources individually tuned to separate frequencies spaced on 0.7 nanometer centers (corresponding to 64 optical channels) used to cover a 43 nanometer bandwidth, associated with a conventional ("C") band amplifier (i.e. from approximately 1526 through 1569 nanometers). The wavelength laser source 100 is typically coupled to an optical signal conditioning circuit used by amplifier test equipment.

The close spacing of the separate lasers in the source is needed to provide a piece wise continuous distribution over the bandwidth to accurately measure the gain spectrum in the presence of spectral hole burning associated with erbium doped fiber amplifiers. The spectral hole is stable over time, is of the order of 4 nanometers wide and cannot be ignored without resulting in an error when measuring the gain spectra of the EDFA. However, a drawback associated with this conventional test-set is that it uses separate laser sources for the corresponding number of optical channels when testing an EDFA.

SUMMARY OF THE INVENTION

Thus, it is an object of the present invention to provide a test method and apparatus to reduce the cost of measuring the gain spectra of optical amplifiers including erbium doped fiber (EDFAs) and Raman amplifier under test. It is another object to reduce the time and/or number of measurement required to test an EDFA. It is yet another object of the present invention to provide a method to improve the accuracy and wavelength resolution of gain spectra measurements.

These and other objects are achieved in a test apparatus that includes a broadband noise source, a test station, and a spectrum analyzer. These and other objects are further achieved by a method that uses the test apparatus to measure the spectral gain of an erbium doped fiber amplifier (EDFA) under test includes steps of providing an optical signal from a broadband noise source to an input of the EDFA under test, measuring a power at a test wavelength at an output of the EDFA under test, adjusting the test wavelength, and repeating the steps of measuring and adjusting for a predetermined number of times.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 2:
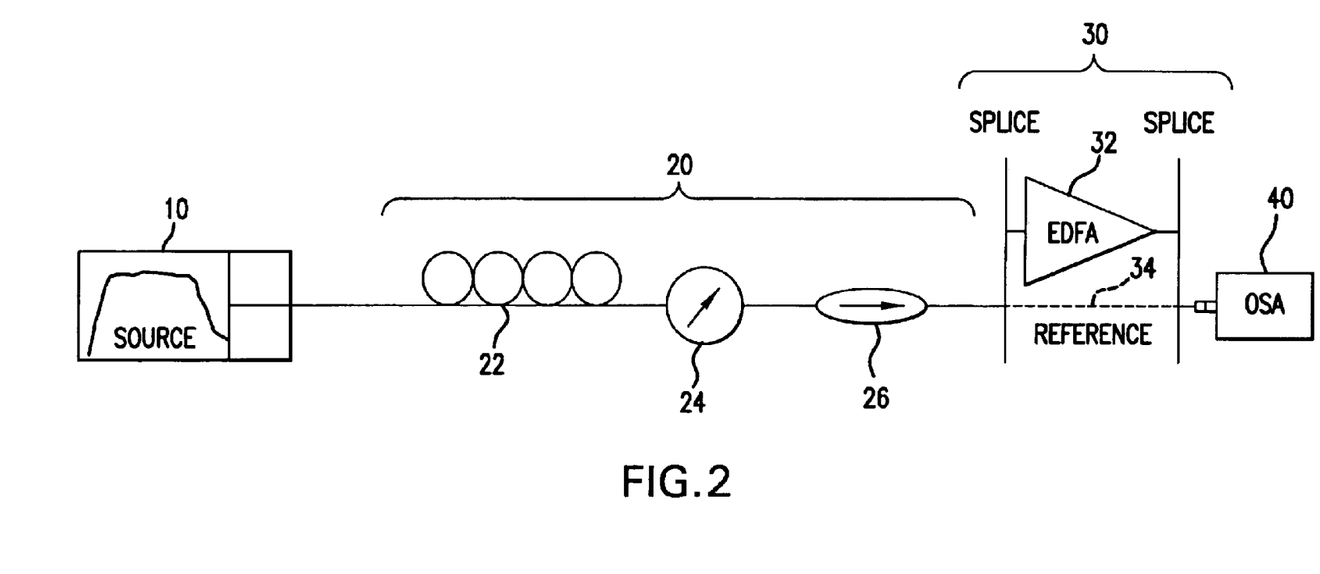
FIG. 2 is a schematic diagram of a test apparatus in accordance with the present invention.

FIG. 2 illustrates an apparatus for measuring the gain spectra of an optical amplifier EDFA which includes, broadband source 10 coupled to optical signal conditioning circuit 20 which feeds test station 30 which in turn feeds optical spectrum analyzer 40. Broadband source 10 is coupled to optical signal conditioning circuit 20.

In one embodiment, optical signal conditioning circuit 20 includes polarization controller 22, attenuator 24 and isolator 26. Attenuator 24 is used to select the desired amount of input power to the EDFA under test without affecting the shape of the signal. Broadband source 10 is coupled to polarization controller 22 which is coupled to attenuator 24 which in turn is coupled to isolator 26. Alternatively, polarization controller 22 may be disposed anywhere within conditioning circuit 20 to minimize sensitivity to polarization dependent losses in the test set-up. Conditioning circuit 20 may also include an optical filter to ensure that signals received by the EDFA under test substantially resembles the amplifier operating conditions. This optical filter ensures that the input optical signal corresponds to the desired operating requirements of the amplifier under test.

Test station 30 includes either unit under test 32 (i.e., the EDFA under test) or reference 34 (e.g., a reference length of fiber). In the measuring process, first, EDFA 32 is connected between optical conditioning circuit 20 and optical spectrum analyzer 40 and a first set of measurements are obtained. Reference 34 is connected between optical conditioning circuit 20 and optical spectrum analyzer 40 and a second set of measurements are obtained. Alternatively, an optical switch configuration may be employed to couple the optical signals to EDFA 32 and/or reference fiber 34 and another switch may be employed to couple EDFA 32 and fiber 34 to OSA 40. Optical spectrum analyzer 40 collects both sets of measurements at discrete wavelengths. Each set is preferably collected at separate wavelengths spaced much closer than 0.8 nanometers over the band of interest (i.e bandwidth of an EDFA). Typically, optical spectrum analyzer 40 includes a pre-filter to pass wavelengths in a pass band that is 0.2 nanometers wide, but may be more or less depending on the desired resolution (e.g., 0.1 for fine resolution studies). The power of the optical signal passing through the pre-filter is measured. The center of the pre-filter's pass band is stepped in small increments (e.g., 40 picometers, but may be more or less) to scan the filter's pass band over the band of interest to measure the whole spectra.

Figure 3:
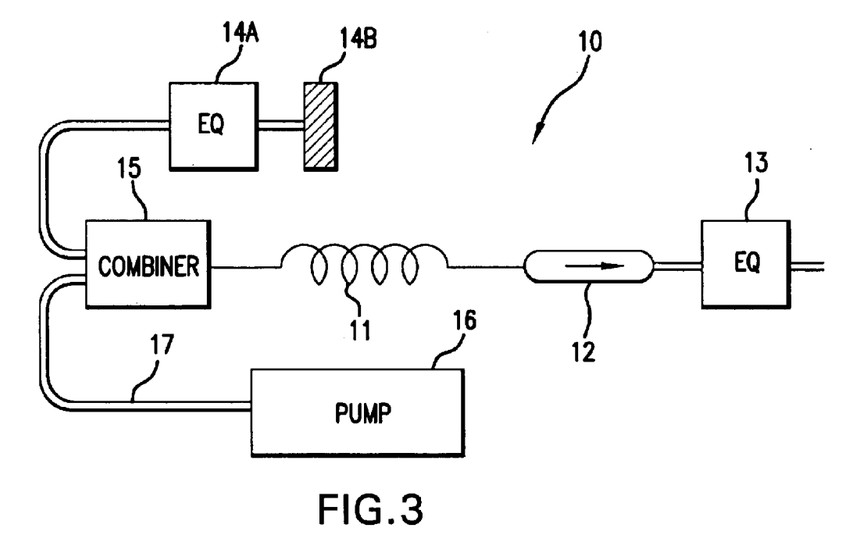
FIG. 3 is schematic diagram of a representative amplified stimulated emission noise source as may be used in the test apparatus of FIG. 2.

FIG. 3 illustrates a representative example of a broadband source 10, however, any broadband noise source may be employed that provides sufficient power within the desired bandwidth. Source 10 includes erbium doped fiber 11, isolator 12 and equalizer 13. Source 10 supplies forward and backward ASE noise ("optical signals") via erbium doped fiber 11. These optical signals are coupled to isolator 12 and equalizer 13 and supplied to optical signal conditioning circuit 20 (FIG. 2). Optical pump signals from optical pump 16 are provided through pump feeder fiber 17 to combiner 15, and an output optical signal from combiner 15 is coupled to erbium doped fiber 11. Equalizer 14A is coupled between combiner 15 and reflector 14B.

In operation, optical signals in erbium doped fiber 11 are amplified and propagated out from both ends of fiber 11. Portions of the amplified signals are counter propagated through combiner 15, through equalizer 14A and reflected at reflector 14B. The reflected optical signals are re-propagated through equalizer 14A and combined with the pump signal in combiner 15 and then amplified again in erbium doped fiber 11. In this way a broadband oscillator is mechanized to implement broadband noise source 10, the output of which is provided through equalizer 13. Equalizer 14A filters the reflected signal with wavelength dependent attenuation so that the spectra of the optical signal originating in fiber 11 and propagated through equalizer 13 is a flat broadband spectra.

It will be appreciated by persons of ordinary skill in the art that various automatic gain control mechanisms may be included, and at least one is preferably included but not shown, within the noise source depicted in FIG. 3 to stabilize the output signal power across the broad bandwidth. For example, a sample of the output signal power may be measured and used to regulate the optical power of the pump signal. It will be further appreciated by persons skilled in the art that alternative broadband noise sources are known to be equivalent to source 10 depicted in FIG. 3 in so far as the source's use in the measurement circuit depicted in FIG. 2.

Noise source 10 need not have an absolutely flat power spectrum since the measurement process described herein compares signals amplified by an EDFA under test with signals passed through a reference. However, a substantially flat power spectrum is desirable to ensure that the EDFA under test is uniformly driven at its intended operating point.

Figure 4:
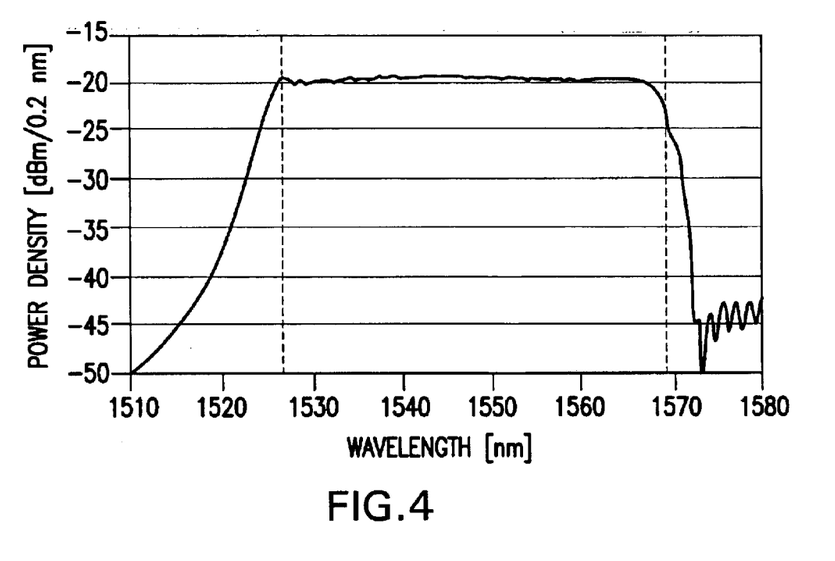
FIG. 4 is a graph of the power spectrum of the output of the noise source of FIG. 3.

FIG. 4 depicts the power spectrum of an amplified spontaneous emission noise source used in test measurements discussed herein as measured on an optical spectrum analyzer using an optical resolution of 0.2 nanometers over the amplifier bandwidth. The noise spectrum is flat within 1 dB over most of the bandwidth, with 95% of the power contained within the desired band between 1526 and 1569 nanometers (the vertical dashed lines in FIG. 4).

As a general proposition, it is important that the entire bandwidth under test be illuminated to an optical power level that corresponds to an operational environment, and therefore, broadband noise source 10 illuminates over the entire spectrum under test during the collection of data for any wavelength.

Figure 5:
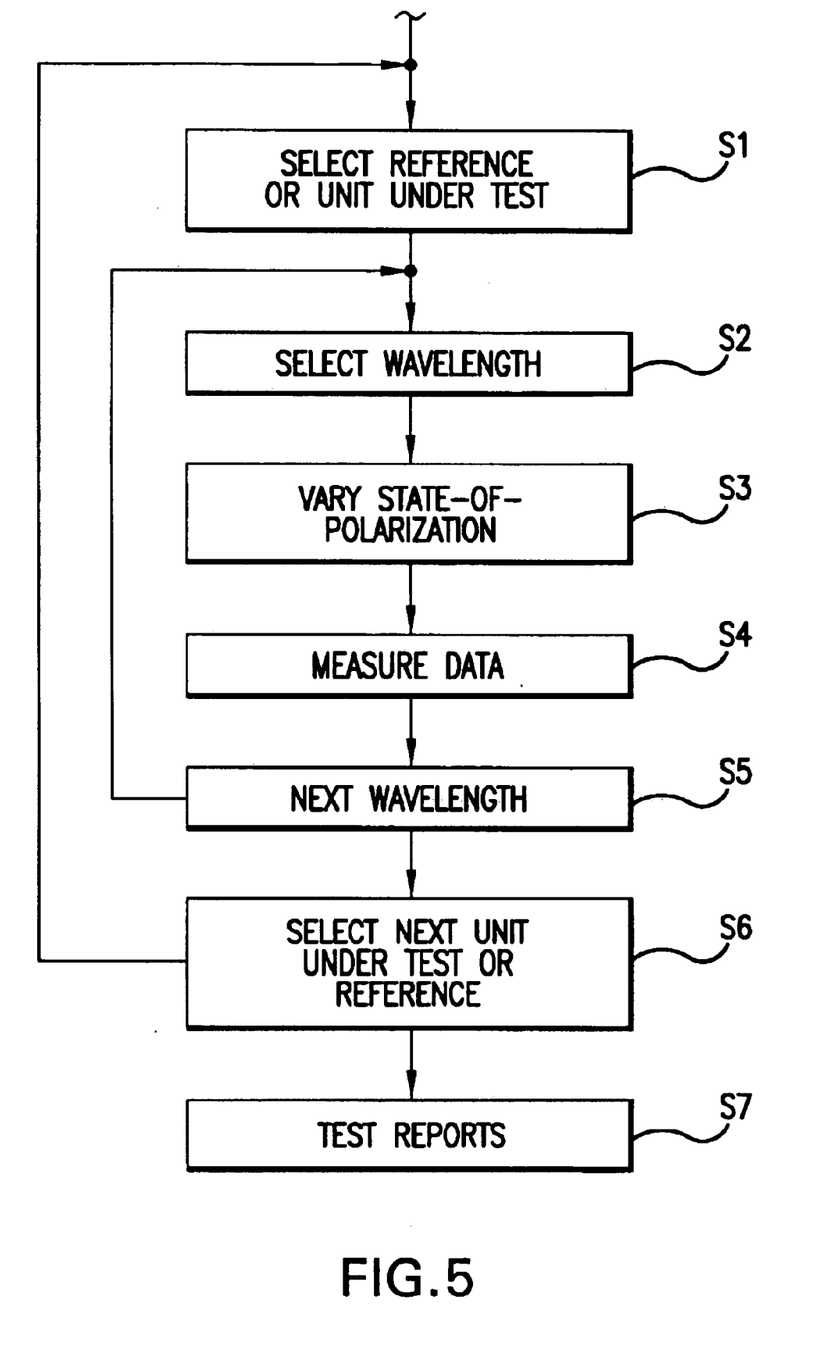
FIG. 5 is a flow chart showing the steps used to measure a gain spectra according to the present invention.

FIG. 5 illustrates a process of measuring the gain spectra of EDFA 32 (FIG. 2). The process includes step S1 (in cooperation with step S6) to configure either EDFA unit under test 32 or reference 34 in test station 30 (FIG. 2). Then, in step S2 (in cooperation with step S5) each wavelength in the test bandwidth is sequentially measured by the OSA so as to cover the bandwidth of the amplifier in discrete steps (for example, for a 64 channel test configuration the steps would be less than 0.8 nanometers to ensure adequate sampling across spectral holes, and typically in steps in the order of 40 picometers with resolution in the order of 0.2 nanometers). While a particular test wavelength is measured (steps S2 and S5), at least one optical power measurement is obtained in step S4. When more than one optical power measurement is obtained in step S4, the measurements are averaged. The time separated measurements are either averaged in step S4 or recorded to be later averaged in step S7.

In step S3, automatic polarization controller 22 is operated to constantly vary the state-of-polarization of the signals passed through EDFA unit under test 32. In step S4, optical spectrum analyzer 40 measures at least one optical power measurement at each wavelength for each time separated measurement (to be averaged). When more than one optical power measurement for each time separated measurement is obtained in step S4 at separately varied polarization angles, the separate measurements with varied polarization angles are either averaged in step S4 or recorded and later averaged in step S7.

In a variant, a complete data set is obtained at each wavelength by optical spectrum analyzer 40. The data set includes a matrix of data organized as a plurality of measurements in one dimension of the matrix for each polarization angle measurement by a plurality of measurements in another dimension of the matrix for each data sample to be averaged over time. Here too, the matrix of data may be either averaged in step S4 or recorded and later averaged in step S7.

If the output of conditioning circuit 20 is unpolarized, polarization controller 22 is not necessary. If, however, the polarization dependent loss of components in source 10 and/or circuit 20 polarize the optical signals, then polarization controller 22 will average the gain over the states of polarization. If automatic polarization controller 22 is employed, it varies the state-of-polarization of the signals passed through EDFA unit under test 32 so that each of the plurality of measurements is at a different, or at least randomly selected, polarization. The varying of the state-of-polarization reduces inaccuracies caused by polarization dependent losses in the setup circuit and polarization hole buring in the EDFA.

In another embodiment, source 10 is an unpolarized filtered broadband noise source, and polarization controller 22 is omitted from the test apparatus (FIG. 2). The step of varying the state-of-polarization (step S3, FIG. 5) is omitted from the processing of testing. The unpolarized nature of noise source 10 (FIG. 3) renders unnecessary step S3 to vary the state-of-polarization. The test procedure can thereby take advantage of the fewer measurements needed to characterize the gain spectrum of the EDFA under test.

After a complete data set is collected (e.g., at all wavelengths in the desired spectral band, and at all polarizations, if such data is collected), in step S6, EDFA under test 32 is swapped with reference fiber 34, and steps S2 through S5 are repeated for the reference fiber. It will be appreciated by persons skilled in the art that reference fiber 34 may be omitted by splicing optical spectrum analyzer 40 directly to isolator 26. That is to say, the in port (i.e., launch pigtail) to and out port (i.e., spectrum analyzer pigtail) from test station 30 may be spliced together.

In step S7, the average over time of all measurements at each test wavelength is computed for each of EDFA under test 32 and reference fiber 34, if any. In embodiments were polarization of the optical signal is varied during the collection of data, the plural measurements at diverse polarization angles are also averaged. The spectral gain (power gain) is computed to be the ratio (or difference when power is measured in dB) of the averaged power measured when EDFA under test 32 is spliced into test station 30 divided by the averaged power measured when reference fiber 34 is spliced into test station 30 (or the in port of station 30 is spliced directly to the out port) at each measured wavelength.

A maximum gain error is used as a measure of data consistancy in cases where plural measurements are taken at each test wavelength. The maximum gain is determined to be the ratio of the maximum power measurement of the plural measurements obtained from the EDFA under test at the test wavelength divided by the minimum power measurement of the plural measurements obtained from the reference at the test wavelength. The minimum gain is determined to be the ratio of the minimum power measurement of the plural measurements obtained from the EDFA under test at the test wavelength divided by the maximum power measurement of the plural measurements obtained from the reference at the test wavelength. The maximum gain error is determined to be a difference between the maximum gain and the minimum gain and may be expressed in dB.

Figure 6:
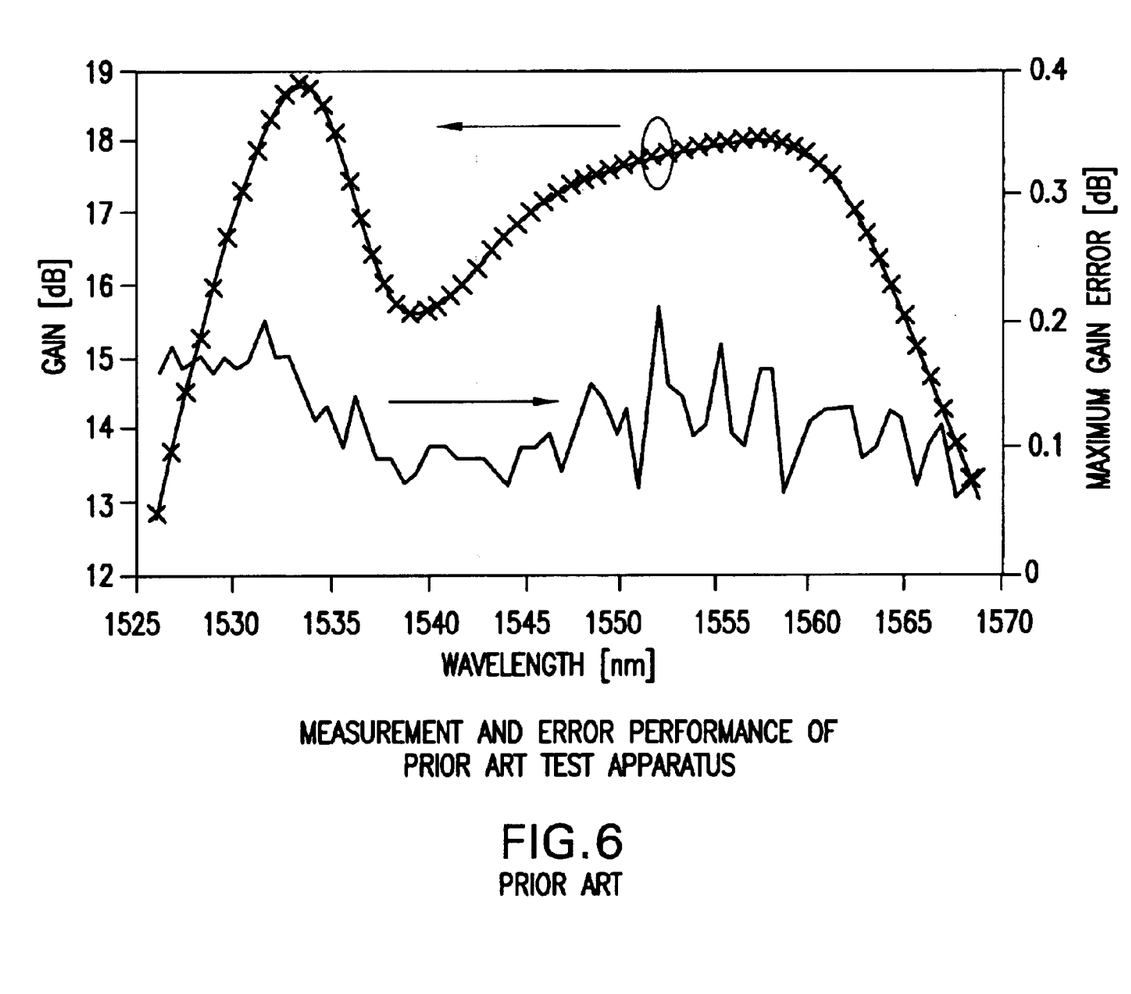
FIG. 6 is a graph of the measured gain spectrum of an erbium doped fiber amplifier measured with a test apparatus that uses a known multiple wavelength signal source.

FIG. 6 is a graphical illustration of the gain determined for an EDFA under test with a known test apparatus where a multiple wavelength source 100 (FIG. 1) is used in place of source 10 as depicted in FIG. 2, and where the power from multiple wavelength source 100 was flattened to within 0.2 dB over the band width of interest. The maximum gain error determined from 10 measurements at each wavelength is expressed in dB and depicted in FIG. 6 and ranges from 0.06 dB to 0.21 dB over the bandwidth of interest. In order to measure the gain to a greater accuracy and reduce the maximum gain error to less than 0.1 dB, multiple data measurements and statistical averaging for the EDFA under test and the corresponding reference are required. This requires extra testing time over and above a single run test. Furthermore, multiple wavelength source 100 has a resolution limited to about 0.7 nanometers based on its 64 discrete lasers needed to span the bandwidth from 1526 to 1569 nanometers. A greater number of lasers would make source 100 prohibitively expensive. As it is, multiple wavelength source 100 (FIG. 1) with 64 lasers costs about 25 times more than amplified spontaneous emission noise source 10 (FIG. 3).

Figure 7:
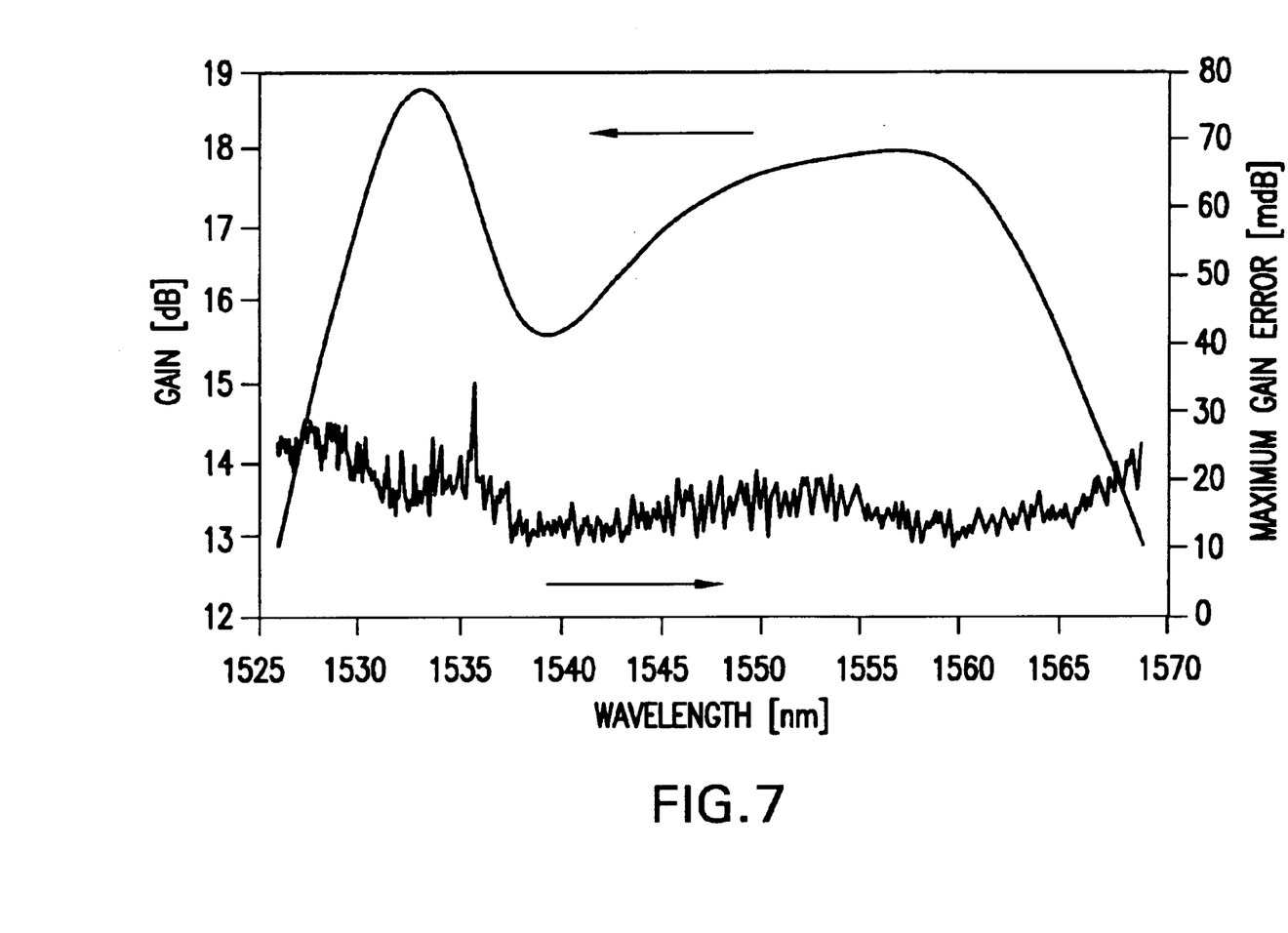
FIG. 7 is a graph of the measured gain spectrum of the erbium doped fiber amplifier measured with a test apparatus that uses a filtered amplified stimulated emission noise signal source according to the present invention.

In the present invention, amplified spontaneous emission noise source 10 improves both resolution and stability of the test apparatus (FIG. 2). FIG. 7 is a graphical illustration of the gain determined for the same EDFA under test using the test apparatus depicted in FIG. 2. The maximum gain error was determined from 10 measurements at each wavelength is expressed in mdB (milli-decibel). This maximum gain error is depicted in FIG. 7 and is less than 34 mdB (0.034 dB) at all wavelengths within the bandwidth of interest. As a consistency measure, this compares favorably to the multiple wavelength source with its 0.21 dB maximum gain error.

To achieve gain measurements with a maximum gain error of less than 0.1 dB at all wavelengths within the bandwidth of interest, it is not necessary to make multiple measurements of the EDFA under test and its reference at each test wavelength if the amplified spontaneous emission noise source 10 of the present invention is used in the test apparatus. In contrast, multiple measurements are needed to statistically average the gain so as to expect a systematic gain error of less than 0.1 dB if multiple wavelength source 100 of the prior art is used. A systematic gain error in a network with 200 EDFAs, each with a gain error of only 0.1 dB, would result in a network gain error of 20 dB. Thus, it is desired to measure the EDFA gain to an accuracy of better than 0.1 dB so that an equalizer can be provided to flatten the power spectrum output from the EDFA to a flatness, on average, of better than 0.1 dB. In this way the systematic gain error in a network can be contained.

Figure 8:
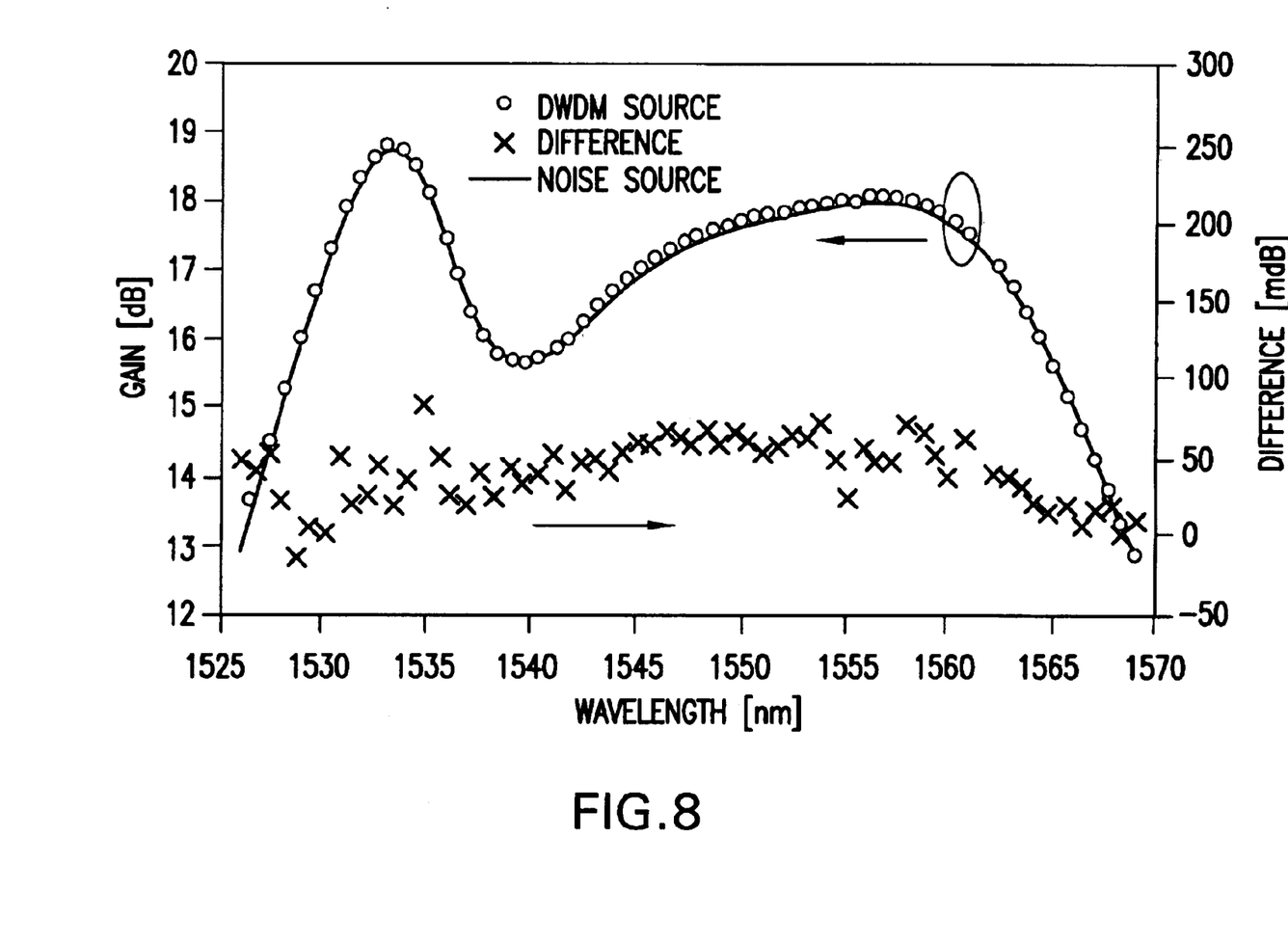
FIG. 8 is a graph comparing the measured gain spectrum of an erbium doped fiber amplifier measured with a test apparatus that uses a known multiple wavelength signal source against the measured gain spectrum of the erbium doped fiber amplifier measured with a test apparatus that uses a filtered amplified stimulated emission noise signal source according to the present invention.

FIG. 8 is a graphical illustration of the gain over the bandwidth determined for the same EDFA under test using the test apparatus of the present invention depicted in FIG. 2, and superimposed on the line as circles is the gain determined for the same EDFA under test with a known test apparatus where a known multiple wavelength source 100 (FIG. 1) is used in place of source 10 as depicted in FIG. 2. Also depicted in FIG. 8 is the difference, expressed as mdB, between the gains determined with the two test apparatuses at wavelengths of the lasers in multiple wavelength source 100. A difference of about 50 mdB (0.05 dB) over most of the wavelength range was observed. This difference is well within the uncertainty of the measurements of the known test apparatus using multiple wavelength source 100.

The closeness of the gain measurements of the two test apparatuses demonstrate that the gain spectrum measured with a test apparatus using a broadband amplified stimulated emission noise source (FIG. 3) and the gain spectrum measured with a test apparatus using multiple wavelength source 100 with closely spaced discrete wavelengths (FIG. 1) are affected in the same way by spectral hole burning. However, the known multiple wavelength source with closely spaced discrete wavelengths is about 25 times more expensive than the filtered broadband amplified stimulated emission noise source. With a test apparatus using noise source 10 of FIG. 3, the number of actual measurements that must be obtained is reduced when compared to a test apparatus using multiple wavelength source 100 since the inherent consistancy of measurements made indicates that each measurement is of greater accuracy. Furthermore, the wavelength resolution achievable with noise source 10 is better than what is achievable with even a very expensive multiple wavelength source 100.

Having described preferred embodiments of a novel test apparatus and method for measuring a gain spectra of an erbium doped fiber amplifier (which are intended to be illustrative and not limiting), it is noted that modifications and variations can be made by persons skilled in the art in light of the above teachings. For example, the optical amplifier may be achieved in any number of stages with an equalizer between stages. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims.

What is claimed is:

1. A test apparatus to measure a gain spectra of an optical amplifier comprising:
    a broadband noise source including an amplified stimulated emission broadband noise source to provide light to said amplifier, said broadband noise source having a desired bandwidth associated with a desired operating requirement of said amplifier;
    a test station including said amplifier under test, said test station coupled to said noise source; and
    an optical spectrum analyzer coupled to said test station.

2. The test apparatus in accordance with claim 1 further comprising a signal conditioning circuit coupled between said broadband noise source and said test station, said signal conditioning circuit comprising:
    a polarization controller coupled to said broadband noise source;
    an attenuator, coupled to said polarization controller; and
    at isolator coupled to said attenuator.

3. The test apparatus in accordance with claim 2 further comprising a optical filter having a pass band corresponding to said bandwidth of said amplifier.

4. The test apparatus in accordance with claim 1 wherein said test station further comprises a reference fiber disposed between said noise source and said spectrum analyzer such that a set of reference measurements are obtained based on an output of said noise source.

5. The test apparatus in accordance with claim 1 wherein said amplifier under test is an erbium doped fiber amplifier.

6. The test apparatus in accordance with claim 1 wherein said amplifier under test is a Raman amplifier.

7. The test apparatus of claim 4 wherein said, test station further comprises a switch coupled to said reference fiber and said amplifier.

8. The test apparatus in accordance with claim 7, wherein said switch is a first switch, said apparatus further comprising a second switch coupled to said reference fiber, said amplifier and said optical spectrum analyzer.

9. The test apparatus in accordance with claim 1 wherein said broadband noise source is a an unpolarized amplified stimulated emission noise source comprising:
    a source of pump light;
    a length of erbium doped optical fiber emitting light in response to said pump light; and
    an optical combiner having an input port coupled to said pump source and an output port coupled to said erbium doped optical fiber.

10. The test apparatus in accordance with claim 9 further comprising:
    an isolator coupled to said erbium doped optical fiber; and
    an optical equalizer coupled to said isolator, said isolator having an output port coupled to said test station.

11. The test apparatus in accordance with claim 9, wherein said output port is a first input and output port, said combiner further comprising a second output port such that said first input and output port receives amplified optical signals counter propagated from said erbium doped optical fiber and supplies said counter propagated signals to said second output port.

12. The test apparatus in accordance with claim 11 wherein said second output port is a second input and output port, said noise source further comprising:
    an equalizer coupled to said second input and output port off said combiner; and
    an optical reflector coupled to said equalizer such that said counter propagated optical signals are reflected by said optical reflector back through said equalizer to said second input and output port of said combiner and supplied to said first input and output port of said combiner and amplified again by said erbium doped optical fiber.

13. A method for testing an erbium doped optical amplifier comprising the steps of;
    providing an optical signal from an unpolarized amplified stimulated emission broadband noise source to an input of an erbium doped fiber amplifier under test;
    selecting a test wavelength within a particular bandwidth of the erbium doped fiber amplifier under test;
    measuring a power at said test wavelength at an output of the erbium doped fiber amplifier under test with a spectrum analyzer;
    adjusting the test wavelength; and
    repeating the steps of measuring and adjusting for a predetermined number of times.

14. The method in accordance with claim 13, wherein the step of measuring includes:
    varying a polarization of the optical signal with a polarization controller coupled between the broadband noise source and the erbium doped fiber amplifier under test;
    obtaining a plurality of optical power measurements at corresponding and diverse polarization angles; and
    averaging the plurality of optical power measurements to determine the power at the test wavelength.

15. The method in accordance with claim 13, further comprising steps of:
    providing an optical signal from the broadband noise source to the spectrum analyzer; and
    measuring a power at a test wavelength at the spectrum analyzer.

16. The method in accordance with claim 13, wherein each step of measuring obtains a single power measurement at the corresponding test wavelength.

17. The method in accordance with claim 15 further comprising the step of varying the selected test wavelength in discrete steps within the bandwidth of the erbium doped fiber amplifier under test.

18. The method in accordance with claim 17 further comprising the step of repeating the steps of measuring and varying for a predetermined number of times such that a gain spectrum of the erbium doped optical amplifier is obtained.

19. The method in accordance with claim 17 wherein the discrete steps are smaller than 0.8 nm such that an adequate sampling across spectral holes is obtained for the erbium doped fiber amplifier under test.

* * * * *